United States Patent [19]

Tani et al.

[11] Patent Number: 4,616,238

[45] Date of Patent: Oct. 7, 1986

[54] INFORMATION RECORDING MEDIUM OF AIR-SANDWICH STRUCTURE

[75] Inventors: Yoshio Tani; Kyoichi Naruo; Masao Yabe, all of Shizuoka, Japan

[73] Assignee: Fuji Photo Film Co., Ltd., Japan

[21] Appl. No.: 787,253

[22] Filed: Oct. 15, 1985

[30] Foreign Application Priority Data

Oct. 12, 1984 [JP] Japan ................................ 59-213579

[51] Int. Cl.$^4$ ........................ G01D 15/32; G11B 7/26
[52] U.S. Cl. .................................... 346/137; 369/284; 369/287
[58] Field of Search ................. 346/137; 369/284, 287

[56] References Cited

U.S. PATENT DOCUMENTS 4,462,036  7/1984  Leonard et al. .................... 346/137
4,564,850  1/1986  Kazuharu ............................ 346/137

Primary Examiner—E. A. Goldberg
Assistant Examiner—Gerald E. Preston
Attorney, Agent, or Firm—Ostrolenk, Faber, Gerb & Soffen

[57] ABSTRACT

In an information recording medium having an air-sandwich structure comprising two disc-shaped substrates opposed to each other at a given space by interposing therebetween a ring-shaped inner spacer and a ring-shaped outer spacer and a recording layer for writing and/or reading information with laser beam which is provided on the inner surface of at least one substrate, the improvement in which at least one spacer is an adhesive-retainable spacer comprising a ring portion of protecting circumferences of the substrates and a protruding ring portion of arranging the two substrates apart, the latter ring portion protruding from a side of the protective ring portion and comprising a front portion for defining the space between the substrates and a stem portion being thinner than the front portion for retaining an adhesive, whereby an excessive adhesive or a volatile material of the adhesive is discharged through a space between the substrate and the stem portion of the protruding ring portion.

5 Claims, 4 Drawing Figures

INFORMATION RECORDING MEDIUM OF AIR-SANDWICH STRUCTURE

BACKGROUND OF THE INVENTION

1. Field of the invention

This invention relates to an information recording medium having an air-sandwich structure, and more particularly to a recording medium having an air-sandwich structure for writing and/or reading information by means of laser beam of high energy density.

2. Description of prior Arts

Information recording media utilizing a beam of high energy density such as laser beam have been developed in recent years and are put to practical use. Such recording medium is generally called "optical disc", and the practical applications thereof have been found, for example, as video disc and audio disc as well as disc memory for large-capacity computer and large-capacity static image file.

The optical disc basically comprises a disc-shaped transparent substrate of a plastic or glass material and a recording layer composed of a metal or a semi-metal such as Bi, Sn, In or Te which is provided on the substrate. Further, a subbing layer of a polymer material is generally provided between the substrate and the recording layer so that the adhesion between the substrate and the recording layer is ensured and the sensitivity of the optical disc is enhanced.

Writing of information on the optical disc can be conducted, for example, by irradiating the optical disc with a laser beam. Under irradiation with the laser beam, the irradiated area of the recording layer of the optical disc absorbs the energy of beam and a rise in temperature locally occurs and as a result, a chemical or physical change is caused to alter optical characteristics of the recording layer in the irradiated area, whereby the recording of information can be made. Reading of information from the optical disc is also conducted by irradiating the optical disc with laser beam. The information can be reproduced by detecting reflected light or transmitted light corresponding to the alteration in the optical characteristics of the recording layer.

As a disc structure for protecting the recording layer, there has been recently proposed an air-sandwich structure in which a recording layer is provided on at least one of two disc-shaped substrates and positioned inside the two substrates opposed to each other at a given space by interposing a ring-shaped inner spacer and a ring-shaped outer spacer between the substrates so as to form space enclosed with the two substrates and the two spacers. In the optical disc having such a structure, the recording layer is not directly exposed to the outer air and the recording and reproduction of information is conducted with laser beam passing through the substrate. Accordingly, in general there is no possibility that the recording layer is physically or chemically damaged or the surface thereof is covered with dust which is to interfere with the recording and reproduction of information.

The conventional information recording medium of air-sandwiched structure generally has an appearance illustrated in FIG. 1 and a section schematically illustrated in FIG. 2.

In FIG. 2, each of two disc-shaped substrates 21a, 21b has a subbing layer 22a, 22b and recording layer 23a, 23b on the surface, respectively. The two substrates are combined with each other via a ring-shaped inner spacer 25 having adhesive layers 24a, 24b on the upper- and under-sides and a ring-shaped outer spacer 27 having adhesive layers 25a, 25b on the upper- and under-sides. Thus, an inner space 28 enclosed with the two substrates 21a, 21b and the two spacers 25, 27 is provided.

As described above, the substrates and the spacers are combined with each other by an adhesive. In the conventional recording medium of air-sandwich structure, the adhesive, its components or its solvent is liable to enter the enclosed inner space and accordingly to reduce the sensitivity and durability of the medium. In more detail, the recording medium of air-sandwich structure is generally constructed to have a high air-tightness. For giving a satisfactory air-tightness to the structure, an excessive amount of an adhesive is supplied between the substrate and the spacer. A portion or most of an excess of the supplied adhesive is accordingly pushed out into the enclosed inner space. Thus introduced adhesive may contact directly the recording layer to deteriorate the characteristics of the recording layer. Otherwise, the introduced adhesive is decomposed in the period of storage or in the writing or reading operation using a laser beam of high energy. The decomposition products may contact the recording layer to deteriorate chemically the recording layer.

Other problem resides in entrance of a solvent of the adhesive. In a certain process for the preparation of the recording medium of air-sandwich structure, an adhesive in a solvent is applied on the substrates and/or the spacers, and the substrates and the spacers are immediately combined and then allowed to stand for drying the adhesive layer. In this process, a portion of the solvent inevitably enters the enclosed inner space. The solvent or its vapor may contact the recording layer to chemically deteriorate the recording layer. Further, the vapor of the solvent may dissolve a part of the formed adhesive layer upon continuous contact with the adhesive layer and accordingly to reduce the air-tightness of the air-sandwich structure.

Moreover, the conventional recording medium of FIG. 2 is sometimes constructed disadvantageously to give variation of thickness within the combined unit. The thickness of the recording medium of air-sandwich structure is defined by the total thickness of the substrates, the spacer and the adhesive layers. The thickness of the adhesive layer varies with variation of pressure applied thereto in the manufacturing process as well as variation of the drying conditions. Accordingly, the thickness of the adhesive layer sometimes varies within the combined unit. The disc of thickness varying locally does not show a satisfactorily flat plane threon and is liable to vibrate in the vertical direction to the disc plane in the rotatory action, possibly resulting in occurrence of focus-out.

As a proposal for solving the above-stated problems of the conventional recording medium of air-sandwich structure, Japanese Patent Provisional Publication No. 58(1983)-64651 teaches a medium using a spacer which has concaves in the areas to contact the substrates, the concave being capable of receiving an adhesive. This prior art is though to effectively solve the above-stated problems as far as the adhesive is employed in an amount precisely corresponding to the inner volume of the concave. However, if the adhesive is employed in an excessive amount to render the adhesion and sealing between the substrate and the spacer complete, the excess portion is inevitably pushed out to enter the enclosed inner space in the same manner as occurring in the conventional recording medium. Further, the spacer structure of this prior art cannot be adopted when the preparation process using an adhesive of the adhesive-in-solvent type is employed.

SUMMARY OF THE INVENTION

It is an object of the present invention to provide an information recording medium of air-sandwich structure which has improved durability and can be prepared with no high skill and under no severe conditions.

It is another object of the invention to provide an information recording medium of air-sandwich structure which shows improved adhesion and sealing between spacers and substrates and keeps its characteristics well in a long-term storage or repeated use.

It is a further object of the invention to provide an optical disc advantageously employable in a variety of uses such as video disc and audio disc as well as disc memory for large-capacity computer and large-capacity static image file.

The present invention resides in an information recording medium having an air-sandwich structure comprising two disc-shaped substrates opposed to each other at a given space by interposing therebetween a ring-shaped inner spacer and a ring-shaped outer spacer and a recording layer for writing and/or reading information with laser beam which is provided on the inner surface of at least one substrate, characterized in that at least one spacer is an adhesive-retainable spacer which comprises a ring portion of protecting circumferences of the substrates and a protruding ring portion of arranging the two substrates apart, the latter ring portion protruding from a side of the protective ring portion and comprising a front portion for defining the space between the substrates and a stem portion being thinner than the front portion for retaining an adhesive, whereby an excessive adhesive or a volatile material of the adhesive is discharged through a space between the substrate and the stem portion of the protruding ring portion.

PREFERRED EMBODIMENTS OF THE INVENTION

Figure 1:
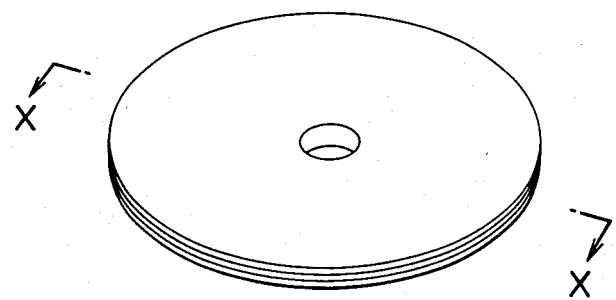
FIG. 1 is a perspective view of an information recording medium of air-sandwich structure.
Figure 2:
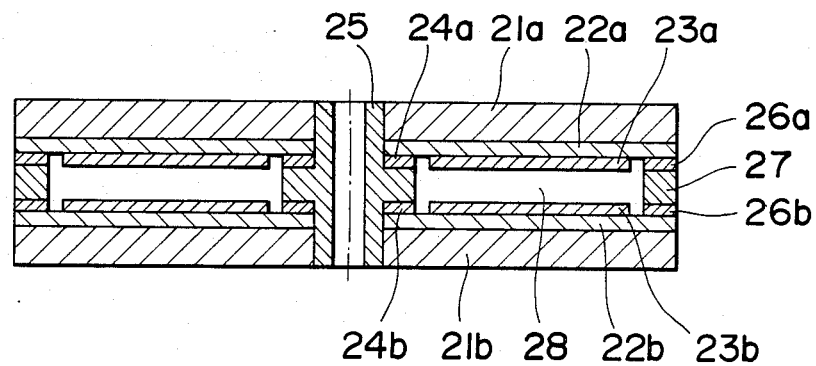
FIG. 2 is a schematic cross-sectional view of the information recording medium of air-sandwich structure taken along the line X—X in FIG. 1. This view shows a typical structure of the conventional air-sandwich type information recording medium.
Figure 3:
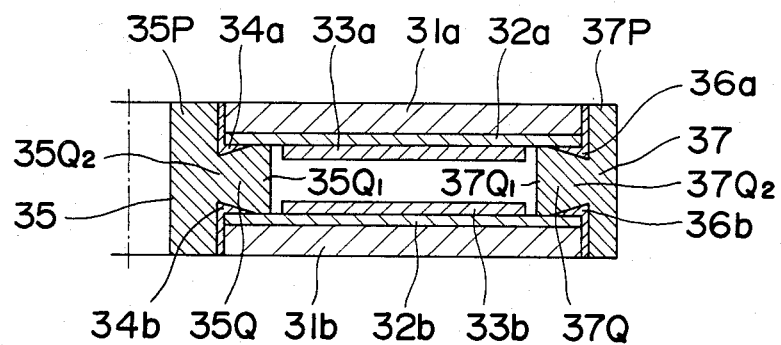
FIG. 3 is a schematic cross-section view of an information recording medium of air-sandwich structure according to the present invention. This view shows a section on the right side, because the section on the left side is a simple mirror image of the section on the right side.
Figure 4:
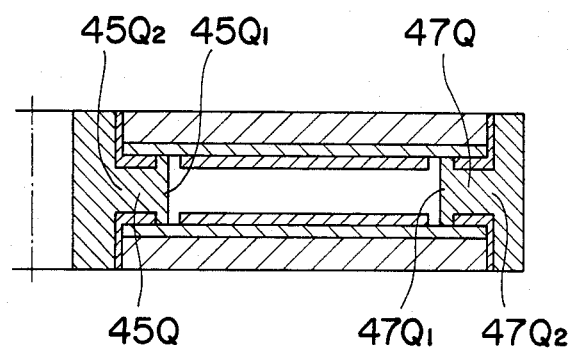
FIG. 4 is a schematic cross-sectional view of another information recording medium of air-sandwich structure according to the present invention. This view also shows a section on the right side.

Preferred embodiments of the information recording medium having an air-sandwich structure according to the present invention are illustrated in FIGS. 3 and 4. FIGS. 3 and 4 both show the characteristic feature of the recording medium of the invention in the same manner as in FIG. 2. Each of FIGS. 3 and 4 shows a section on the right side, because the section on the left side is a simple mirror image of the section on the right side.

The information recording medium of air-sandwich structure according to the invention basically comprises, for instance as shown in FIG. 3, two disc-shaped substrates $31a$, $31b$, opposed to each other at a given space by interposing therebetween a ring-shaped inner spacer 35 and a ring-shaped outer spacer 37, a subbing layer $32a$, $32b$ and a recording layer $33a$, $33b$ for writing and/or reading information with laser beam which is provided on the inner surface of the substrate via the subbing layer.

In the embodiment shown in FIG. 3, each of the inner spacer 35 and the outer spacer 36 is made to form an adhesive-retainable spacer. The adhesive-retainable spacer comprises a ring portion 35P, 37P of protecting a circumference of the substrates and a protruding ring portion 35Q, 37Q of arranging the two substrates apart. The latter ring portion 35Q, 37A protrudes from a side of the protective ring portion 35P, 37P and comprises a front portion $35Q_1$, $37Q_1$ for defining the space between the substrates and a stem portion $35Q_2$, $37Q_2$ which is thinner than the front portion $35Q_1$, $37Q_1$. The stem portion $35Q_2$, $37Q_2$ is provided for receiving an adhesive $34a$, $34b$, $36a$, $36b$, whereby an excessive adhesive or a volatile material of the adhesive is discharged through a space between the substrate and the stem portion of the protruding ring portion.

As shown in FIG. 3, the inner spacer and the outer spacer both can be adhesive-retainable spacers, and this embodiment is advantageous to provide an information recording medium almost free form the disadvatageous features of the conventional recording medium. However, it is also possible to select any one of these spacer to be an adhesive-retainable spacer and to use as another spacer a conventional type spacer such as seen in FIG. 2.

Since the information recording medium of air-sandwich structure according to the invention uses as a spacer an adhesive-retainable spacer such as illustrated in FIG. 3, the space or thickness between the enclosed inner space is precisely defined by the thickness of the front portion of the spacer. In more detail, since the surface of the front portion has no or little adhesive thereon, the variation of thickness of the adhesive layer which is one of disadvantageous features of the conventional air-sandwich type recording medium is obviated almost completely. Accordingly, a recording medium using such adhesive-retainable spacer is prepared with highly equal thickness throughout the medium plane.

Moreover, since the information recording medium of air-sandwich structure according to the invention uses as a spacer an adhesive-retainable spacer such as illustrated in FIG. 3, an excessive portion of the adhesive retained in the retaining area thereof is pushed out or escaped toward the outer space (or space between the outer or inner circumferential edge of substrate and the inner surface of the protective ring portion) through a space between the stem of the protruding portion of the spacer and the substrate. Accordingly, the escape of an excessive portion of the adhesive into the enclosed inner space which is one of disadvantageous features of the conventional air-sandwich type recording medium is obviated almost completely. For this reason, a recording medium using such adhesive-retainable spacer is almost free from decrease of the sensitivity and decrease of durability of the medium which is caused by the presence of an excessive portion of an adhesive, decomposition products thereof, a component of an adhesive, etc.

Furthermore, in the case that an adhesive is applied in the form of a solution in a solvent, almost whole of a volatile component such as a solvent escapes toward the outer space through a space between the stem of the protruding portion of the spacer and the substrate. Thus, the escape of a volatile component of the adhesive into the enclosed inner space which is one of disadvantageous features of the conventional air-sandwich type recording medium is obviated very effectively. Accordingly, a recording medium using such adhesive-retainable spacer is almost free from decrease of the sensitivity and decrease of durability of the medium which is caused by the presence of a volatile component of an adhesive such as a solvent.

It should be understood that the subbing layer 32a, 32b seen in FIG. 3 may be not provided on the substrate, and the recording layer may be provided on one substrate only. Thus, other members than the specifically defined spacer can be optionally chosen from known members of the conventional information recording medium.

Further, the adhesive-receiving area such as a concave seen in FIG. 3 can be provided on only one of the upper-side and under-side of the protruding portion of the spacer. However, the objects of the present invention are more effectively attained in the case that the adhesive-retaining area is provided on either of the upper-side and under-side of the protruding portion of the spacer.

FIG. 3 shows an adhesive-retainable spacer having a protruding portion which is so tappered that the thickness continuously increases from the stem to the front. However, the adhesive-retainable spacer is not limited to such embodiment, and there is no specific limitation with respect to the shapes, dimensions, etc. of the spacer and particularly the adhesive-retainable area, provided that the spacer is under the conditions defined in the claim.

For example, the protruding portion of the adhesive-retainable spacer has an adhesive-retaining concave, the concave having an equal depth throughout thereof, as illustrated in FIG. 4.

In the embodiment shown in FIG. 4, a protruding ring portion 45Q, 47Q comprises a front portion $45Q_1$, $47Q_1$ for defining the space between the substrates and a stem portion $45Q_2$, $47Q_2$ which has concaves of an equal depth throughout the protruding portion on either the upper-side and the under-side so that the stem portion is made thinner than the front portion $45Q_1$, $47Q_1$.

The information recording medium having an air-sandwich structure of the present invention can be prepared, for example, in the following manner.

The substrate material employed in the invention can be selected from any materials which have been employed as the substrates of the conventional information recording media. From the viewpoint of optical characteristics, smoothness, workability, handling properties, long-term stability and manufacturing cost, preferable examples of the substrate material include glass such as tempered glass, acrylic resins such as cell-cast polymethyl methacrylate and injection-molded polymethyl methacrylate; vinyl chloride resins such as polyvinyl chloride and vinyl chloride copolymer; polycarbonate resins; and epoxy resins. Among these materials, glass, acrylic resins and polycarbonate resins are preferred.

The surface of the substrate on which a recording layer is placed may be provided with a subbing layer for the purpose of improving smoothness, adhesion to the recording layer and sensitivity by heat insulating and preventing the recording layer from being denatured. Examples of material employable for the preparation of the subbing layer include polymer materials such as polymethyl methacrylate, acrylic acid-methacrylic acid copolymer, polyesters, polyimides, vinyl acetate-vinyl chloride copolymer, ethylene-vinyl acetate copolymer, polyethylene, polypropylene and polycarbonate.

The subbing layer can be formed on the substrate, for example, by the following procedure. First, a coating solution (or dispersion) is prepared by dissolving or dispersing the polymer material in a solvent. The coating solution (or dispersion) is then applied to the surface of the substrate by a conventional coating process such as spin coating, dip coating, extrusion coating, bar coating or screen printing. The thickness of the subbing layer is generally in the range of 0.01 to 20 $\mu$m, preferably 0.1 to 10 $\mu$m and more preferably 0.02 to 1 $\mu$m.

The recording layer is then formed on the subbing layer or directly on the substrate. Examples of material employable for the preparation of the recording layer include metals such as Te, Zn, In, Sn, Zr, Al, Cu and Ga; semi-metals such as Bi, As and Sb; semiconductors such as Ge and Si; and alloys thereof and combinations thereof. Further, sulfides, oxides, borides, silicides, carbides and nitrides of these metals and these semi-metals and mixtures of these compounds and the above-stated metals can also be employed as the material of the recording layer.

The recording layer can be formed directly on the substrate or on the subbing layer by means of metallizing, sputtering or ion plating process. The recording layer may be composed of a single layer or plural layers. The thickness of the recording layer is generally in the range of 100 to 5,500 angstroms from the viewpoint of optical density required for the optical recording.

When the recording medium is dedicated to reproducing only, a fine pattern of recess and protrusion is previously formed on one side of the substrate by means of a stamper and a layer of a reflecting material such as Al or Cu may be then formed thereon.

A thin film of an inorganic material such as silicon dioxide, tin oxide or manganese fluoride may be formed on the free surface of the substrate (the surface not facing the recording layer) by means of vacuum metallizing or sputtering process in order to increase resistance to damage and moisture proofness.

After the formation of the recording layer on the substrates, two substrates are bonded to each other with an adhesive under atmospheric conditions or inert gas conditions by interposing spacers therebetween in such a manner that the recording layer is positioned inside the substrate.

As described hereinbefore, the recording medium of the invention uses as at least one of th spacer, namely, the inner spacer, the outer spacer, or both of the spacers, the adhesive-retainable spacer.

There is no specific limitation with respect to the material of the spacer. Preferably, the spacer is made of aluminum metal or aluminum alloy. The aluminum metal spacer or aluminum alloy spacer may be treated by an anodizing processing. The anodized spacer may be further treated by any of known supplemental processings such as processings with boiling water, alkaline solution, discharge, or coating of a silane-coupling agent. These supplemental processing effectively enhances adhesion between the spacer and an adhesive applied thereon. Further, thus processed spacer has an improved appearance.

The substrate and the spacer is bonded to each other with an adhesive. There is no specific limitation with respect to the nature of the adhesive. Thus, any of known adhesives can be employed. However, an adhesive which is curable under irradiation of radiation such as ultraviolet rays or an electron beam is preferably used from the viewpoint of its durability.

Examples of the radiation-curable adhesive include (meth)acrylic acid, (meth)acrylate esters particularly (meth)acrylate ester of polyhydric alcohol, (meth)acrylamide, acrylonitrile, and their derivatives.

The radiation-curable adhesive is generally employed in combination with a sensitizing agent. Examples of the sensitizing agent empolyable in the adhesive include benzoin alkylethers, benzylketals, acetals, acetophenone derivatives, benzophenone derivatives, xanthone derivatives, thioxanthone derivatives, anthraquinone derivatives, and benzaldehyde derivatives. The sensitizing agent can be employed singly or in combination.

We claim:

1. In an information recording medium having an air-sandwich structure comprising two disc-shaped substrates opposed to each other at a given space by interposing therebetween a ring-shaped inner spacer and a ring-shaped outer spacer and a recording layer for writing and/or reading information with laser beam which is provided on the inner surface of at least on substrate, the improvement in which at least one spacer is an adhesive-retainable spacer comprisign a ring portion of protecting circumferences of the substrates and a protruding ring portion of arranging the two substrates apart, the latter ring portion protruding from a side of the protective ring portion and comprising a front portion for defining the space between the substrates and a stem portion being thinner than the front portion for retaining an adhesive, whereby an excessive adhesive or a volatile material of the adhesive is discharged through a space between the substrate and the stem portion of the protruding ring portion.

2. The information recording medium as claimed in claim 1, wherein said stem portion of the adhesive-retainable spacer has an adhesive-retaining concave on either of the upper-side and under-side thereof.

3. The information recording medium as claimed in claim 1 or 2, wherein each of said inner spacer and said outer spacer is the adhesive-retainable spacer.

4. The information recording medium as claimed in claim 1 or 2, wherein said protruding portion of the adhesive-retainable spacer is so tappered that the thickness continuously increases from the stem thereof to the front thereof.

5. The information recording medium as claimed in claim 1 or 2, wherein said protruding portion of the adhesive-retainable spacer has an adhesive-retaining concave, the concave having an equal depth throughout thereof.

* * * * *